United States Patent [19]

Witkowski et al.

[11] E Re. 29,835

[45] Reissued Nov. 14, 1978

[54] 1,2,4-TRIAZOLE NUCLEOSIDES

[75] Inventors: Joseph T. Witkowski, Laguna Niguel; Roland K. Robins, Santa Ana, both of Calif.

[73] Assignee: ICN Pharmaceuticals, Irvine, Calif.

[21] Appl. No.: 782,294

[22] Filed: Mar. 28, 1977

Related U.S. Patent Documents

Reissue of:

[64] Patent No.: 3,798,209
Issued: Mar. 19, 1974
Appl. No.: 240,252
Filed: Mar. 31, 1972

U.S. Applications:

[63] Continuation-in-part of Ser. No. 149,017, Jun. 1, 1971, abandoned.

[51] Int. Cl.[2] ..... C07H 19/06; C07H 19/10

[52] U.S. Cl. ..... 536/29; 424/180; 536/23

[58] Field of Search ..... 536/23, 29

[56] References Cited

U.S. PATENT DOCUMENTS 3,541,079 11/1970 Schramm et al. ..... 536/23

*Primary Examiner*—Johnnie R. Brown

*Attorney, Agent, or Firm*—K. H. Boswell; Mary Helen Sears; Edward Irons

[57] ABSTRACT

As antiviral agents and intermediates therefor, 3-substituted 1-(β-D-glycosyl)-1,2,4-triazoles, O-acylated analogs thereof, and 5'- and 3',5'-cyclic phosphates of the triazole nucleosides, "glycosyl" being [a pentofuranosyl moiety, preferably one whose 2'-oxygen is trans to the triazole aglycon, e.g., xylofuranosyl,] ribofuranosyl, [2-0-methylribofuranosyl, etc.,] the triazole aglycon being 3-substituted with cyano, methylcarboxylate, carboxamidoxime, carboxamido-, thiocarboxamido, or carboxamidine. Preparation of these nucleosides is by silylation of the substituted triazole followed by glycosylation with the appropriate blocked glycosyl halide. Alternatively, acid-catalyzed fusion of the requisite 1,2,4-triazole with an O-acylated pentofuranose yields the nucleosides.

18 Claims, No Drawings

1,2,4-TRIAZOLE NUCLEOSIDES

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part of our copending U.S. application Ser. No. 149,017 of the same title filed Jun. 1, 1971 and now abandoned.

BACKGROUND OF THE INVENTION

Presently, the only two known nucleosidic antibiotic agents having 5-membered heterocyclic rings are showdomycin and pyrazomycin, which have respectively been reported to have structures (1) and (2):

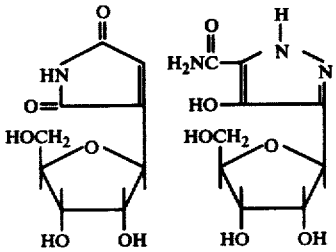

(1) (2)

Among the presently known synthetic nucleosidic antiviral agents, the more important are 5-iodo-2'-deoxyuridine (5-IDU) 9-β-D-arabinofuranosyl adenine (Ara-A) and 1-β-D-arabinofuranosyl cytosine (Ara-C). Of these agents, only 5-IDU (in 0.1% wt. solution) is commercially available specifically as an antiviral agent, and this compound suffers the disadvantage of low solubility and high toxicity, from whence arises the undesirably great dilution in which it is now employed.

Alsonso et al. in J. Heterocyclic Chem. 7, 1269–72 (1970) report the preparation of 1-(β-D-ribofuranosyl)-4-carboxamido-1,2,3-triazole but make no mention of biological activity. Witkowski and Robins, in "The Chemical Synthesis of the 1,2,4-Triazole Nucleosides Related to Uridine, 2'-Deoxyuridine, Thymidine and Cytidine," J. Org. Chem. 35, 2635–41 (1970) suggest various 1,2,4-triazole nucleoside analogs as candidates for biological testing, but no particular efficacy is noted and our later testing has shown that, of the analogs there reported, only 5-bromo-3-nitro-1-(2,3,5-tri-O-acetyl-β-D-ribofuranosyl)-1,2,4-triazole exhibits even slight antiviral activity and even this activity is believed to be attributable merely to the cytotoxicity of the compound.

BRIEF SUMMARY OF THE INVENTION

According to this invention, there are provided compounds of formula

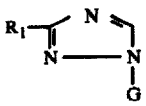

wherein "G" is [a pentofuranosyl moiety, preferably characterized by 2'-oxygen trans to the triazole aglycon] *β-D-ribofuranosyl,* $R_1$ being cyano-, carboxamido-, thiocarboxamido-, -methylcarboxylate, carboxamidine, or a physiologically acceptable acid addition salt of the latter group. The invention also embraces the O-acylated analogs of the foregoing compounds and the 5'-phosphates and 3',5'-cyclic phosphates thereof as well as the ammonium and alkali metal salts of the phosphates. Preferred embodiments include compounds of structure

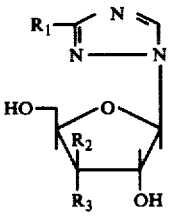

where $R_1$ is as previously defined and [one of] $R_2$ [or $R_3$] is hydrogen, [the other being] *and $R_3$ is* hydroxyl, as well as 5'-phosphates and 3',5'-cyclic phosphates thereof. Compounds according to this invention exhibit antiviral activity and, in nonacylated or "deblocked" embodiments, exhibit substantially greater aqueous solubility than earlier reported nucleosidic antiviral agents. The preferred 1-(β-D-ribofuranosyl)-1,2,4-triazole-3-carboxamide nucleoside of the invention has exhibited a broad spectrum of antiviral activity as well as, in laboratory animals, antitumor activity.

DETAILED DESCRIPTION OF THE INVENTION

Methyl 1,2,4-triazole-3-carboxylate and 3-cyano-1,2,4-triazole are precursors in alternative synthetic routes to 1,2,4-triazole nucleosides of the invention. The former compound can be conventionally prepared by oxidation of 3-methyl-1,2,4-triazole followed by esterification of the resulting acid according to the procedure of Cipens and Grinsteins' Latvijas PSR Zinatnu Akad. Vestis., Kim. Ser. (1965) (2) 204–08 (see C.A. 63, 13243, 1965). 3-cyano-1,2,4-triazole is prepared by a multi-step synthesis reported by Cipens et al., supra, or more conveniently, by the addition reaction of cyanogen and hydrazine to form 1-cyanoformimidic acid hydrazide, followed by acid-catalyzed ring closure in triethylorthoformate to the 3-cyano compound. By one route, the trimethylsilyl derivative of the methyl 1,2,4-triazole-3-carboxylate is formed in quantitative yield by reaction with hexamethyldisilazane under reflux and reacted with an appropriate O-acylated halo sugar GX to form, for example, a mixture of O-benzoylated 1-(β-D-ribofuranosyl)-1,2,4-triazole-3-carboxylic acid methyle ester and 5-carboxylic acid methyl ester, i.e.:

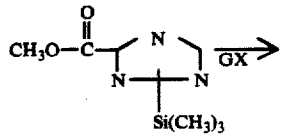

-continued

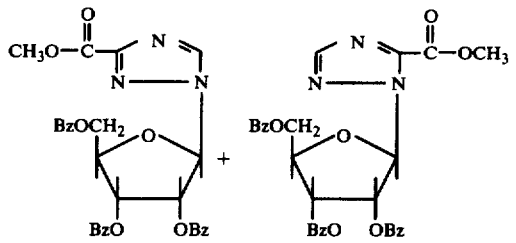

wherein $B_z$ is benzoyl. The 3-carboxylic acid methyl ester is separated by fractional crystallization or, preferably, by column chromatography over silica gel. Debenzoylation and aminolysis gives the 1-(β-D-ribofuranosyl)-1,2,4-triazole-3-carboxamide.

The preferred method of synthesis is by the acid-catalyzed fusion of an appropriately substituted triazole with the O-acyl blocked sugar (in this case 1-O-acetyl-2,3,5-tri-O-benzoyl-β-D-ribofuranose) followed by deblocking and aminolysis, i.e.:

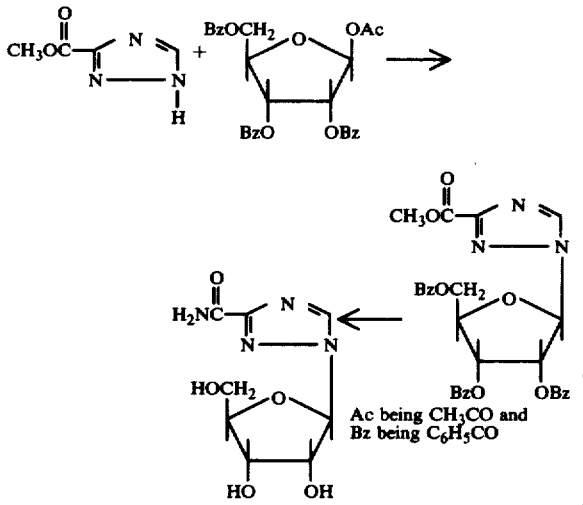

Alternatively, fusion can be had with 3-cyano-1,2,4-triazole with later conversion of the 3-cyano-1-(2,3,5-tri-O-acetyl-β-D-ribofuranosyl)-1,2,4-triazole to the active 3-carboxamido nucleoside by reaction with hydrogen peroxide in the presence of aqueous ammonia, albeit in lesser yields than when fusion occurs with methyl 1,2,4-triazole-3-carboxylate.

The 3-cyano-1-(2,3,5-tri-O-acetyl-β-D-ribofuranosyl)-1,2,4 triazole, whether obtained by the silylation or fusion procedure, is a useful intermediate to formation of the active 1-(β-D-ribofuranosyl)-1,2,4-triazole-3-thiocarboxamide nucleosides of the invention as by reaction of the same with hydrogen sulfide in the presence of triethylamine followed by deacylation where the blocked nucleoside is employed as the intermediate. Similarly, the nucleosidic 1,2,4-triazole-3-carboxamidines can be made from the 3-cyano-1,2,4-triazole nucleoside either with or without intermediate formation of the 3-carboxamidoxime analog, i.e.:

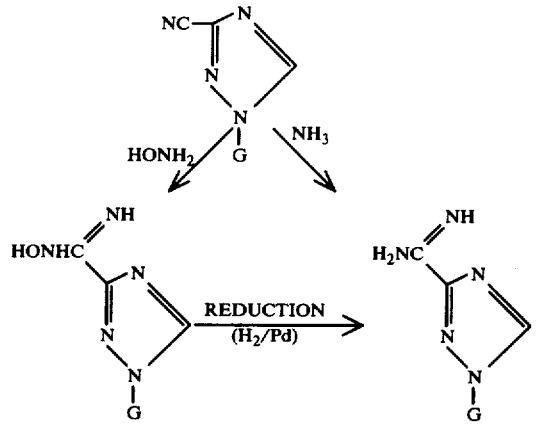

where G is a glycosyl moiety as above-defined. The carboxamidine is obtained in free form from the synthesis involving the carboxamidoxime intermediate. Contrarywise, the preferred preparation directly from the 3-cyano compound in the presence of ammonium chloride yields the carboxamidine in the form of its hydrochloride salt, and other physiologically acceptable acid addition salts (e.g., hydrobromic, hydroiodic, citric, acetic, sulfuric, phosphoric acid addition salts) may be obtained therefrom by ion exchange or alternatively by neutralization of the hydrogen chloride salt with sodium bicarbonate, followed by reaction of the resulting free carboxamidine with an appropriate acid.

The 3-carboxamido, 3-thiocarboxamido and 3-carboxamidine nucleosides of the invention may be converted to the corresponding 5'-phosphate or ammonium or alkali metal salt of the phosphate and administered as such. Similarly, 5'-phosphates of the intermediate 3-methyl carboxylates, 3-cyano- and 3-carboxamidoxime compounds of the invention may be formed prior to operations at position 3 of the triazole aglycon leading to formation of the active nucleotides. Those skilled in the art are fully acquainted with the method and manner of phosphorylating nucleosides. In a preferred embodiment of the invention, the 5'-phosphate of 1-(β-D-ribofuranosyl)-1,2,4-triazole-3-carboxamide is formed by reaction of 1-(β-D-ribofuranosyl)-1,2,4-triazole-3-carboxylic acid methyl ester with $POCl_3$ in trimethyl phosphate, followed by hydrolysis in ice water to yield the free 5'-phosphate. Formation of the ammonium salt and aminolysis of the methyl ester occur simultaneously on tratment with aqueous ammonia. Alkali metal salts or the free 5'-phosphate of the 1-(β-D-ribofuranosyl)-1,2,4-triazole-3-carboxamide nucleotide can then be obtained from the ammonium salt of the phosphate by ion exchange.

For enhanced cellular transport, the 3',5'-cyclic phosphates of the active carboxamido, thiocarboxamido and carboxamidine compounds of the invention may be secured by dicyclohexylcarbodiimide (DCC) cyclization of corresponding 5'-phosphates. Alternatively, 5'-phosphates of the cyano-, methylcarboxylate and carboxamidoxime intermediates may be cyclized prior to operations on position 3 of the aglycon leading to said active cyclic nucleotides. In either case, the cyclic phosphates may be employed either in free form or in the form of ammonium or alkali metal salts obtained as in the case of the 5'-phosphates.

While the invention has been described with particular reference to acetyl or benzoyl blocking of the 2', 3' and 5' hydroxyls of the glycosyl moiety, it will be understood that any acyl group may be employed to preserve those hydroxyls against side reactions such as dehydration during synthesis of the active agents of the invention. Sutherland et al., in Biochim. et Biophys Acta 148, 106 (1967) have reported that acylation of cyclic nucleotides enhances cellular transport. Similarly, otherwise free glycosyl hydroxyls of the nucleotides and nucleosides of the invention may be acylated for enhanced lipid solubility or, e.g., provided with alkyl or alkaryl sulfonyl groups such as, e.g., tosyl, mesyl, brosyl, nisyl, etc. to the same end.

While the 1'-"leaving group" of the sugar reagents discussed above has been characterized as acetyl or, in the silyation procedure, as halo-, it will be understood that any displaceable moiety may be employed subject to amenability to byproduct separation.

[While, for the sake of example, reference above has been to β-D-ribofluranosyl and xylofuranosyl moieties, it will be appreciated that the invention includes employment of other glycosyl moieties as well, i.e., 2'-deoxy-β-D-ribofuranosyl, 2'-deoxy-α-D-ribofuranosyl and β-D-arabinofuranosyl. In the case of the 2'-deoxy triazole nucleosides precursor sugars employed may include 2-deoxy-1,3,5-tri-O-acetyl-D-ribofuranose or 1-O-acetyl-2-deoxy-3,5-di-O-(para-toluoyl)-D-ribofuranose, the latter arising from treatment of 2-deoxy-3,5-di-O-(para-toluoyl)-D-ribofuranosyl chloride with mercuric acetate in tetrahydrofuran.]

[The arabinosyl triazole nucleosides are made by the silylation procedure, employing 2,3,5-tri-O-benzyl-D-arabinofuranosyl chloride.]

[Given biological activity of the ribofuranosyl triazoles of the invention, activity in the correspondingly substituted arabinofuranosyl triazoles would appear to follow, especially in view of the known antiviral activity of "Ara-A" and "Ara-C" discussed above. Similarly, biological activity of the corresponding 2'-deoxy-β-D-ribofuranosyl triazoles is suggested by the known antiviral activity of 5-iodo-2'-deoxy uridine, once given efficacy of the ribofuranosyl triazoles of the invention, especially as against essentially DNA viruses like Herpes Types 1 and 2. However, when these compounds were tested against the viruses of Example 16, infra, essentially no antiviral activity was seen, apparently owing to the inability of enzymes present in the tissue culture to phosphorylate free nucleosides whose glycosyl moieties lack trans 2'-oxygen atoms. Hence, these nucleosides should be synthetically phosphorylated to the believed active 5'-phosphate form prior to administration. Alternatively, the 5'-phosphate may be cyclized before administration, in vivo cleavage yielding the active 5'-phosphate metabolite. The phosphorylation procedure is essentially like that described above for preparation of the ribotides.]

The invention is further illustrated and described in the following examples, in which all parts and percentages are by weight and all temperatures in degrees centigrade unless otherwise qualified. All evaporative procedures were carried out in a rotary evaporator under diminished pressure at 35° C.

EXAMPLE 1

1-(2,3,5-tri-O-benzoyl-β-D-ribofuranosyl)-1,2,4-triazoles-3-carboxylic acid methyl ester and 1-(2,3,5-tri-O-benzoyl-β-D-ribofuranosyl)-1,2,4-triazole-5-carboxylic acid methyl ester (silylation procedure)

(A) Preparation of methyl N-(trimethylsilyl)-1,2,4-triazole-3-carboxylate. A suspension of methyl 1,2,4-triazole-3-carboxylate (14.0 g., 110 mmole) and hexamethyldisilazane (100 ml.) was refluxed with stirring until evolution of ammonia ceased (ca. 2 hrs.). The excess hexamethyldisilazane was removed under diminished pressure to provide 20.6 g. (100%) of the N-trimethylsilyl derivative of methyl 1,2,4-triazole-3-carboxylate.

(B) Ribosylation with halo sugar: A solution containing methyl N-(trimethylsilyl)-1,2,4-triazole-3-carboxylate (20.6 g., 110 mmole) and 2,3,5-tri-O-benzoyl-D-ribofuranosylbromide (52.5 g., 100 mmole) in anhydrous acetonitrile (300 ml.) was kept at 25° for 3 days. The solvent was removed and the residue was crystallized from ethanol. Recrystallization of the material from ethyl acetate-ethanol and column chromatography of the filtrates over silica gel with chloroform provided pure 1-(2,3,5-tri-O-benzoyl-β-D-ribofuranosyl)-1,2,4-triazole-3-carboxylic acid methyl ester (25.1 g., 44.0%) with M. P. 137–139°.

Analysis.—Calcd. for $C_{30}H_{25}N_3O$ (percent): C, 63.04; H, 4.41; N, 7.35. Found (percent): C, 62.91; H, 4.17; N, 7.10.

The faster migrating component from the silica gel column was crystallized from ethanol to provide 1-(2,3,5-tri-O-benzoyl-β-D-ribofuranosyl)-1,2,4-triazole-5-carboxylic acid methyl ester (13.2 g., 23.1%) with M.P. 122–124°.

Analysis.—Found (percent): C, 63.20; H, 4.35; N, 7.12.

EXAMPLE 2

1-(2,3,5-tri-O-benzoyl-β-D-ribofuranosyl)-1,2,4-triazole-3-carboxylic acid methyl ester (fusion procedure)

A mixture of methyl 1,2,4-triazole-3-carboxylate (12.7 g., 100 mmole) and 1-O-acetyl-2,3,5-tri-O-benzoyl-β-D-ribofuranose (55.4 g., 110 mmole) was heated in an oil bath maintained at 160–165°. After the sugar had melted, bis(p-nitrophenyl) phosphate (400 mg.) was added with stirring and the mixture was heated under diminished pressure at 160–165° for 15–20 min. Crystallization of the residue from ethyl acetate-ethanol provided 42.5 g. (74.5%) of product with M.P. 137–139°.

EXAMPLE 3

1-(2,3,5-tri-O-acetyl-β-D-ribofuranosyl)-1,2,4-triazole-3-carboxylic acid methyl ester A mixture of methyl 1,2,4-triazole-3-carboxylate (12.7 g., 0.10 mol) and 1,2,3,5-tetra-O-acetyl-β-D-ribofuranose (31.8 g., 0.10 mol) was heated in an oil bath maintained at 160–165° until the sugar had melted. Bis(p-nitrophenyl) phosphate (250 mg.) was added and heating at 160–165° was continued with stirring under diminished pressure for 15–20 min. The residue was dissolved in hot benzene, the solution was filtered and cyclohexane was added to the filtrate to give the crystalline product (30.0 g., 77.8%) with M.P. 107–109°.

Analysis—Calcd. for $C_{15}H_{19}N_3O_9$ (percent): C, 46.75; H, 4.97; N, 10.91. Found (percent): C, 46.88; H, 5.03; N, 10.64.

EXAMPLE 4

1-(β-D-ribofuranosyl)-1,2,4-triazole-3-carboxylic acid methyl ester

A solution of 1-(2,3,5-tri-O-benzoyl-β-D-ribofuranosyl)-1,2,4-triazole-3-carboxylic acid methyl ester (25.0 g., 43.8 mmol) and sodium methoxide (400 mg.) in methanol (200 ml.) was refluxed for 45 min. The solution was neutralized with Bio-Rad AG50-X2 (H), filtered and the filtrate was concentrated to a syrup. Crystallization of the syrup from methanolethyl acetate provided 8.0 g. (70.5%) of product with M.P. 117–199°.

Analysis.—Calcd. for $C_9H_{13}N_3O_6$ (percent): C, 41.70; H, 5.06; N, 16.21. Found (percent): C, 41.57; H, 5.13; N, 16.16.

EXAMPLE 5

(A) 1-(β-D-ribofuranosyl)-1,2,4-triazole-3-carboxamide (Method 1)

A solution of 1-(2,3,5-tri-O-benzoyl-β-D-ribofuranosyl)-1,2,4-triazole-3-carboxylic acid methyl ester (16.0 g., 28.0 mmole) in methanol (300 ml., presaturated with anhydrous ammonia at 0°) was kept in a sealed pressure flask at 25° for 3 days. The solvent was removed and the product was crystallized from ethanol to give 6.7 g. (98%) of material with M.P. 174–176°. Recrystallization of the product from aqueous ethanol provided a second crystalline form of the nucleoside with M.P. 166–168°.

Analysis.—Calcd. for $C_8H_{12}N_4O_5$ (percent): C, 39.34; H, 4.95; N, 22.94. Found (percent): C, 39.08, H, 5.10; N, 22.67.

(B) 1-(β-D-ribofuranosyl)-1,2,4-triazole-3-carboxamide (Method 2)

A solution of 1-(2,3,5-tri-O-acetyl-β-D-ribofuranosyl)-1,2,4-triazole-3-carboxylic acid methyl ester (10.0 g., 26.0 mmole) in methanol (70 ml.) saturated at 0° with anhydrous ammonia was kept in a sealed pressure flask at 25° for 18 hrs. The product was crystallized from ethanol to give 1-(β-D-ribofuranosyl)-1,2,4-triazole-3-carboxamide (5.70 g., 90.0%).

(C) 1-(β-D-ribofuranosyl)-1,2,4-triazole-3-carboxamide (Method 3)

A mixture of 3-cyano-1-(2,3,5-tri-O-acetyl-β-D-ribofuranosyl)-1,2,4-triazole (705 mg., 2.0 mmole), 28% aqueous ammonia (20 ml.) and 30% hydrogen peroxide (3.0 ml.) was stirred at 25° for 6 hrs. An additional 3.0 ml. portion of 30% hydrogen peroxide was then added and stirring at 25° was continued for 12 hrs. The excess hydrogen peroxide was destroyed by addition of platinum black, the solution was filtered, the filtrate was evaporated to dryness. The residue was dissolved in methanol and silic gel (5.0 g.) was added to the solution. The solvent was removed and the silica gel mixture was applied to a silica gel column. Elution with ethyl acetate-methanol (1:1) provided 1-(β-D-ribofuranosyl)-1,2,4-triazole-3-carboxamide (250 mg., 51.2%).

EXAMPLE 6

1-(β-D-ribofuranosyl)-1,2,4-triazole-3-carboxamide 3′,5′-cyclic phosphate ammonium salt To 1-(β-D-ribofuranosyl)-1,2,4-triazole-3-carboxamide 5′-phosphate ammonium salt (5.7 g., 15.9 mmole) in pyridine was added 4-morpholine-N,N′-dicyclohexylcarboxamidine (4.65 g., 15.9 mmole) and the resulting solution was evaporated in vacuo several times with pyridine to an anhydrous syrup. The syrup was dissolved in 1 liter of pyridine and added dropwise (over a one hour period), through a reflux condenser, into a refluxing anhydrous solution of dicyclohexylcarbodiimide (16.4 g., 79.6 mmole) in 3 liters of pyridine. The solution was refluxed for a further two hours and 200 ml. water was added slowly. After ca. 12 hours the solution was evaporated in vacuo and to the residue was added 200 ml. water and 50 ml. ether. The suspension was stirred vigorously and then filtered. The aqueous layer was separated and extracted with 2X 100ml. ether. The aqueous layer was passed through Dowex 50 ($NH_4^+$ form, 100–200 mesh) and the eluant evaporated to a syrup. Ethanol ca. 100 ml. was added to the syrup and the resulting mixture set at room temperature ca. 12 hours. The crude precipitate was filtered and the filtrate set at room temperature for two weeks. The resulting precipitate (1.2 g.) was dissolved in 5 ml. warm water and then 40 ml. ethanol was added. The resulting crystals were filtered and dried 12 hours at 78° C. over $P_2O_5$, in vacuo to give 1.05 g. of 1-(β-D-ribofuranosyl)-1,2,4-triazole-3-carboxamide 3′,5′-cyclic phosphate ammonium salt: $\alpha_D^{25°}=67°$ (c.=1,$H_2O$); IR (KBr) 1688 cm.$^{-1}$

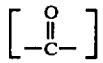

M.P. 245 d.

Analysis.—Calcd. for $C_8H_{11}N_4O_7P{\cdot}NH_3$ (percent): C, 29.73; H, 4.36; N, 21.66. Found (percent): C, 29.86; H, 4.67; N, 21.47.

EXAMPLE 7

1-(β-D-ribofuranosyl)-1,2,4-triazole-3-carboxamide 5′-phosphate ammonium salt A solution of 1-(β-D-ribofuranosyl)-1,2,4-triazole-3-carboxylic acid methyl ester (259 mg., 1.00 mmole), trimethyl phosphate (3.0 ml.) and phosphoryl chloride (0.20 ml.) were stirred at 0° for 1.5 hrs. Ice water as added and the solution was neutralized with aqueous sodium hydrogen carbonate. The solution was extracted with chloroform and the aqueous phase was cooled to 0° and saturated with ammonia. The solution was kept at 25° for 16 hrs. then it was filtered and the filtrate was concentrated to a small volume. Addition of ethanol gave a precipitate which was dissolved in water and passed through a Bio-Rad AG50W-X2 ($NH_4$) column (20 ml.). Concentration of the fractions containing the nucleotide provided the ammonium salt of 1-(β-D-ribofuranosyl)-1,2,4-triazole-3-carboxamide 5′-phosphate (190 mg., 53.0%).

Analysis.—Calcd. for $C_8H_{16}N_5O_8P.H_2O$ (percent): C, 26.74; H, 5.05; N, 19.50. Found (percent): C, 26.78; H, 5.23; N, 19.68.

EXAMPLE 8

1-(β-D-ribofuranosyl)-1,2,4-triazole-3-thiocarboxamide

A mixture of 3-cyano-1-(2,3,5-tri-O-acetyl-β-D-ribofuranosyl)-1,2,4-triazole (8.0 g., 22.7 mmole), triethylamine (14.0 ml.) and ethanol (200 ml.) was stirred at 25° while hydrogen sulfide gas was passed into the solution for 2 hrs. The solvent was removed and the residue was treated with a solution of sodium methoxide (600 mg.) in methanol (150 ml.) for three hours at 25°. After the solution was neutralized with Bio-Rad AG 50W-X2(H), it as filtered, and the solvent was removed. Crystallization of the product from aqueous ethanol provided 4.5 g. (76.0%) of the thiocarboxamide with M.P. 173–175°.

Analysis.—Calcd. for $C_8H_{12}N_4O_4S$ (percent): C, 36.92; H, 4.65; N, 21.53; S, 12.32. Found (percent): C, 37.12; H, 4.90; N, 21.26; S, 12.02.

EXAMPLE 9

3-cyano-1-(2,3,5-tri-O-acetyl-β-D-ribofuranosyl)-1,2,4-triazole

A mixture of 3-cyano-1,2,4-triazole (9.41 g., 0.10 mol) and 1,2,3,5-tetra-O-acetyl-β-D-ribofuranose (31.8 g., 0.10 mol) was heated in an oil bath maintained at 150°. Bis(p-nitrophenyl) phosphate (100 mg.) was added with stirring and heating at 150° under diminished pressure was continued for 15 min. The residue was dissolved in chloroform, the solution was filtered and the solvent was removed. Crystallization of the residue from ether provided 28.2 g. (80%) of product with M.P. 96–97°.

Analysis.—Calcd. for $C_{14}H_{16}N_4O_7$ (percent): C, 47.73; H, 4.58; N, 15.90. Found (percent): C, 47.79; H, 4.63; N, 15.95.

EXAMPLE 10

1-(β-D-ribofuranosyl)-1,2,4-triazole-3-carboxamidine hydrochloride

A mixture of 3-cyano-1-(2,3,5-tri-O-acetyl-β-D-ribofuranosyl)-1,2,4-triazole (7.04 g., 20.0 mmole) ammonium chloride (1.07 g., 20.0 mmol) and anhydrous ammonia (150 ml.) was heated in a bomb at 85° for 18 hours. After removal of excess ammonia, the residue was crystallized from acetonitrile-ethanol to provide 5.30 g. (95%) of product with M.P. 177°–179° dec.

Analysis.—Calcd. for $C_8H_{14}ClN_5O_4$ (percent): C, 34.35; H, 5.05; Cl, 12.68; N, 25.04. Found (percent): C, 34.39; H, 5.06; Cl, 12.73; N, 24.99.

EXAMPLE 11

1-(β-D-ribofuranosyl)-1,2,4-triazole-3-carboxamidoxine

A solution of 3-cyano-1-(2,3,5-tri-O-acetyl-β-D-ribofuranosyl)-1,2,4-triazole (3.0 g., 8.52 mmol) and excess hydroxylamine in ethanol (100 ml.) was refluxed with stirring for 2 hrs. The solvent was removed and the product was crystallized from aqueous ethanol to provide 2.0 g. (90.7%) of the carboxamidoxine with M.P. 212–214° dec.

Analysis.—Calcd. for $C_8H_{13}N_5O_5$ (percent): C, 37.07; N, 5.06; N, 27.02. Found (percent): C, 36.80; H, 4.92; N, 27.23.

[EXAMPLE 12]

[1-(βD-xylofuranosyl)-1,2,4-triazole-3-carboxamide]

[A mixture of tetra-O-acetyl-D-xylofuranose (12.7 g., 40.0 mmol) methyl 1,2,4-triazole-3-carboxylate (5.08 g., 40.00 mmol) and bis-(p-nitrophenyl) phosphate (50 mg.) was heated under reduced pressure for 20 min. in an oil bath maintained at 160–165°. The residue was cooled and dissolved in chloroform. The crude product was purified by chromatography on silica gel with chloroform-acetone (20:1). A portion (2.0 g.) of the purified 1,2,3,5-tri-O-acetyl-β-D-xylofuranosyl)-1,2,4-triazole-3-carboxylic acid methyl ester was treated for 16 hrs. at 25° with methanol saturated with methanol saturated with ammonia. The solvent was removed and the residue was crystallized from aqueous ethanol to provide 0.70 g. of product with M.P. 194°–196.5°.]

[Analysis.—Calcd. for $C_8H_{12}N_4O_5$ (percent): C, 39.34; H, 4.95; N, 22.94. Found (percent); C, 39.18; H, 4.82; N, 22.97.]

EXAMPLE [13] *12*

1-(2,3,5-tri-O-acetyl-β-ribofuranosyl)-1,2,4-triazole-3-carboxamide

A solution of 1-(β-D-ribofuranosyl)-1,2,4-triazole-3-carboxamide (488 mg., 2.00 mmol) in pyridine (10.0 ml.) containing acetic anhydride (1.0 ml.) was added and the solution was stirred at room temperature for 2 hrs. The solvent was removed and water was added to the residue. The mixture was extracted with methylene chloride (three 20-ml. portions) and the organic layer was extracted with aqueous sodium hydrogen carbonate and water. The organic phase was dried over magnesium sulfate, filtered, and evaporated to a syrup which was applied to a silica gel column. Elution with chloroform-methanol (19:1) provided the pure product as an amorphous solid (560 mg., 75.6%).

Analysis.—Calcd. for $C_{14}H_{18}N_4O_8$ (percent); C, 45.40; H, 4.90; N, 15.13. (percent): (percent); C, 45.36; H, 466; N, 14.90.

1-(2,3,5-tri-O-acetyl-β-D-ribofuranosyl)-1,2,4-triazole-3-carboxamide, when given orally twice daily for 9 days at dosages of 125 and 250 mg./kg./day to mice infected with influenza $A_2$ (Jap 305) significantly increased the number of survivors as well as mean survival time of the treated animals relative to controls.

[EXAMPLE 14]

[1-(β-D-arabinofuranosyl)-1,2,4-triazole-3-carboxamide]

[A solution containing methyl N-(trimethylsilyl)-1,2,4-triazole-3-carboxylate (4.12 g., 22.0 mmol) and 2,3,5-tri-O-benzyl-D-arabinofuranosyl chloride (100 ml.) was kept at 25° for 48 hrs. The solution was evaporated to dryness, the residue was dissolved in methylene chloride and the solution was washed with aqueous sodium hydrogen carbonate and water. The methylene chloride solution was dried over magnesium sulfate, filtered, and concentrated to a syrup which was applied to a silica gel column packed in benzene. Elution of the column with benzene-ether (7:3) provided 1.9 g. of syrupy product which was treated with methanol (50 ml.) saturated at 0° with anhydrous ammonia in a pressure flask at 25° for 48 hrs. The solvent was removed and the product was crystallized from methylene chloride-cyclohexane to provide 1.3 g. (12.6%) of 1-(2,3,5-tri-O-benzyl-β-D-arabinofuranosyl)-1,2,4-triazole-3-carboxamide with M.P. 100–102°.]

[Analysis.—Calcd. for $C_{29}H_{30}N_4O_5$ (percent): C, 67.69; H, 5.88; N, 10.89. Found (percent): C, 67.82; H, 5.70; N, 10.94.]

[A suspension of palladium black and methanol (20 ml.) was prepared by reduction of palladium chloride (300 mg.) with hydrogen and to this was added a solution of 1-(2,3,5-tri-O-benzyl-β-D-arabinofuranosyl)-1,2,4-triazole-3-carboxamide (600 mg.) in methanol (25 ml.) The mixture was shaken on a hydrogenation apparatus at 25 p.s.i. for 2 hrs. at 20°. The catalyst was removed by filtration and the solution was passed through a column of Amberlite IR 45 (OH) (15 ml.). The solvent was removed and the residue was crystallized from ethanol to give 250 mg. (88.5%) of product with M.P. 189–191°.]

[Analysis.—Calcd. for $C_8H_{12}N_4O_5$ (percent): C, 39.34; H, 4.95; N, 22.94. Found (percent): C, 39.25; H, 4.86; N, 23.09.]

[EXAMPLE 15]

[(A) 1-0-acetyl-2-deoxy-3,5-d-O-p-toluoyl-D-ribofuranose]

[A mixture of 2-deoxy-3,5-di-O-p-toluoyl-D-ribofuranosyl chloride (15.6 g., 40.0 mmol), mercuric acetate (12.7 g., 40.0 mmol) and tetrahydrofuran (200 ml.) was stirred at 20° for 10 hours. The solvent was removed and chloroform was added to the residue. The mixture was extracted with 30% aqueous potassium iodide (four 60-ml portions) and water. The organic phase was dried over magnesium sulfate, filtered and concentrated to a syrup (16.0 g., 97.0%). Crystallization of a portion of the product from cyclohexane-benzene provided pure material with M.P. 88–91°.]

[Analysis.—Calcd. for $C_{23}H_{24}O_7$ (percent): C, 66.98; H, 5.87. Found (percent): C, 67.23; H, 5.97.]

[(B) 1-(2-deoxy-3,5-di-O-p-toluoyl-α-D-ribofuranosyl)-1,2,4-triazole-3-carboxylic acid methyl ester and 1-(2-deoxy-3,5-di-O-p-toluoyl-β-D-ribofuranosyl)-1,2,4-triazole-3-carboxylic acid methyl ester]

[A mixture of 1-O-acetyl-2-deoxy-3,5-di-O-p-toluoyl-D-ribofuranose (4.54 g., 11.0 mmol), methyl 1,2,4-triazole-3-carboxylate (1.27 g., 10.0 mmol) and bis(p-nitrophenyl) phosphate (10 mg.) was heated with stirring under diminished pressure for 10–15 min. in an oil bath maintained at 150°. The residue was dissolved in methylene chloride and the solution was filtered, then washed with aqueous sodium hydrogen carbonate and water. The organic phase was dried over magnesium sulfate, filtered, and evaporated to a syrup. Column chromatography of this anomeric mixture over silica gel with chloroform provided the α-anomer which was crystallized from cyclo-hexane-methylene chloride to give 780 mg. of pure product with M.P. 94–95°.]

[Analysis.—Calcd. for $C_{25}H_{25}N_3O_7$ (percent): C, 62.62; H, 5.26; N, 8.76. Found (percent): C, 62.44; H, 5.16; N, 8.64.]

[Subsequent fractions from the silica gel column contained a mixture of the α- and β-anomers. These fractions were combined and the mixture was further purified by column chromatography over silica gel with chloroform to provide the β-anomer as a syrup.]

[(C) 1-(2-deoxy-β-D-ribofuranosyl)-1,2,4-triazole-3-carboxamide]

[A solution of 1-(2-deoxy-3,5-di-O-p-toluoyl-β-D-ribofuranosyl)-1,2,4-triazole-3-carboxylic acid methyl ester (650 mg., 1.35 mmol) in methanol (20 ml.) saturated at 0° with anhydrous ammonia was kept at 25° for 3 days in a sealed pressure bottle. The solvent was removed and the residue was applied to a silica gel column. Elution with ethyl acetate-methanol (9:1) provided 1-(2-deoxy-β-D-ribofuranosyl)-1,2,4-triazole-3-carboxamide (250 mg., 80.8%) as an amorphous solid.]

[Analysis.—Calcd. for $C_8H_{12}N_4O_4$ (percent): C, 42.10; H, 5.30; N, 24.55. Found (percent): C, 41.86; H, 5.12; N, 24.49.]

[(D) 1-(2-deoxy-α-D-ribofuranosyl)-1,2,4-triazole-3-carboxamide]

[A solution of 1-(2-deoxy-3,5-di-O-p-toluoyl-α-D-ribofuranosyl)-1,2,4-triazole-3-carboxylic acid methyl ester (780 mg., 1.63 mmol) in methanol (25 ml.) saturated at 0° with anhydrous ammonia was kept in a sealed pressure flask at 25° for 3 days. The solvent was removed and the crude product was applied to a silica gel column. Elution with ethyl acetate-methanol (9:1) provided 1(2-deoxy-α-D-ribofuranosyl)-1,2,4-triazole-3-carboxamide (350 mg., 94.4%) as an amorphous solid.]

[Analysis.—Calcd. for $C_8H_{12}N_4O_4$ (percent): C, 42.10; H, 5.30; N, 24.55. Found (percent): C, 41.88; H, 5.48; N, 24.29.]

[By the same procedure employed to convert the separated methyl ester anomers to their respective carboxamides, the anomeric mixture of the methyl esters formed in part (B) above may be reacted with ammonia to yield a mixture of the α- and β-anomers of the carboxamide.]

EXAMPLE [16] *13*

Antiviral agents of the invention are tested for activity against both small and large viruses of both DNA and RNA types by the virus rating (VR) method of Sidwell et al., Appl. Micbrobiol. 22, 797 (1971). V.R. > 1.0 is indicative of definite antiviral activity, V.R. of 0.5–0.9 is indicative of moderate antiviral activity, and V.R. < 0.5 suggests slight or no apparent antiviral activity. The results reported below, which for comparison sake include data taken with various known antiviral agents, were obtained by testing on MIcrotest II (Falcon Plastics) plastic panels with a monolayer of KB or RK13 cells.

TABLE I

| | | COMPARATIVE ANTIVIRAL ACTIVITY | | | | | | | |
|---|---|---|---|---|---|---|---|---|---|
| No. | Compound | Type 1 herpes V.R. | Type 2 herpes V.R. | Myxoma V.R. | Pseudo-rabies V.R. | Vac-cinia V.R. | Adeno V.R. | Para-influenza V.R. | Type 13 Rhino V.R. |
| 1 | 1-(β-D-Ribofuranosyl)-1,2,4-triazole-3-carbox-amide. | 1.5, 1.0, 1.2 | 1.3 | 1.7 | 0.0, 0.0 | 1.0, 0.9 | 0.5, 0.5 | 1.0, 1.0, 0.8 | 0.5 |
| 2 | Ammonium salt of the 5'-phosphate of 1-(β-D-ribofuranosyl)-1,2,4-triazole-3-carbox-amide. | 0.7, 0.8 | 0.9 | — | — | 0.5 | 0.0 | 0.5 | 0.3 |
| 3 | 1-(β-D-Ribofuranosyl)-1,2,4-triazole-3-thiocar-boxamide. | 1.0, 0.5 | — | 0.2 | 0.1 | 0.3 | 0.0 | 0.0, 0.0 | 0.1, 0.2 |
| [4] | [1-(β-D-Xylofuranosyl)- | [0.7, 1.2] | — | [0.95] | [0.8] | [0.7] | [0.1] | [0.7, 0.8] | [0.4, 0.5] |

TABLE I-continued

| No. | Compound | COMPARATIVE ANTIVIRAL ACTIVITY Type 1 herpes V.R. | Type 2 herpes V.R. | Myxoma V.R. | Pseudo-rabies V.R. | Vac-cinia V.R. | Adeno V.R. | Para-influenza V.R. | Type 13 Rhino V.R. |
|---|---|---|---|---|---|---|---|---|---|
| | 1,2,4-triazole-3-carbox-amide.] | | | | | | | | |
| 5 | 1-(β-D-Ribofuranosyl)-1,2,4-triazole-3-carbox-amidine hydrochloride. | 0.8, 1.0 | — | 1.1 | 0.6 | — | 0.1 | 0.7, 0.8 | 0.6 |
| 6 | 1-(β-D-Ribofuranosyl)-1,2,4-triazole-3-carbox-amide 3',5'-cyclic phos-phate ammonium salt. | 0.65, 0.8 | — | 0.7 | 0.5 | — | 0 | 0 | 0.6, 0.5 |
| 7 | 5-IDU | 1.4, 1.0, 1.6 | 1.8 | 0.8 | 0.6 | 1.3 | 0.2 | 0.0 | 0.0 |
| 8 | Ara-C | 1.2, 1.1 | 0.8 | 0.6 | 0.4 | 0.8 | 0.2 | 0.1 | 0.1 |
| 9 | Ara-A | 0.7, 1.1 | 0.6 | 0.8, 0.8 | 0.6, 1.1 | 0.7, 0.9 | 0.0, 0.0 | 0.1 | 0.1 |

Compound 1 above has been tested in rabbits and hamsters and at nontoxic doses displays significant anti-HSV keratitis activity. The compound significantly inhibits the development of HSV-induced lesions in mousetails when administered locally to the infection. It has also been tested in mice against influenza A2, influenza B and parainfluenza 1, with highly significant antiviral activity seen in these experiments. This compound, it should be noted from Table 1 above, displays a spectrum of antiviral activity substantially broader than that exhibited by IDU, Ara-A or Ara-C. In addition to the antiviral activity documented above, 1-(β-D-ribofuranosyl)-1,2,4-triazole-3-carboxamide has been found to inhibit growth of the bacteria Pseudomonas aeruginosa and the fungi Candida albicans and Cryptococcus diffluens.

All of the compounds [(1–6)] *(1–3,5,6)* above exhibited low cytotoxicity and were soluble in aqueous media.

1-(β-D-ribofuranosyl)-1,2,4-triazole-3-carboxamide also possesses interesting antitumor activity. Three groups of C 57 Blk./6 mice (6 animals per ground) were given subcutaneous implants of adenocarcinoma-755. Two groups received the compound (100 mg./kg. × 7 days and 200 mg./kg. × 7 days) intraperitoneally, whereas the third control group received only saline. On the 16th day the treated animals showed 18% and 63% inhibition of the tumor respectively as compared to the controls. In a similar experiment DBA/2 mice inoculated with L-1210 leukemia ($1 \times 10^5$ cells per animal) showed a 31% increase in median survival time over controls when treated with the compound (250 mg./kg. × 7 days). When given at a dosage of 250 mg./kg. × 14 days, the compound produced 80% survivors from Swiss mice bearing intraperitoneal implants of Ehrlich ascites carcinoma. Marginal in vivo activity against Novikoff hepatoma was also seen.

We have also discovered that 1,2,4-triazole-3-carboxamide itself exhibits significant antiviral activity. When tested by the foregoing procedure, the following VR data was obtained: Herpes Type 1–0.6, 1.0; Vaccinia—0.8; and Parainfluenza 9.6, 0.6. VR results when this compound was tested against Adeno and Rhino Type 13 viruses were, respectively, 0.0 and 0.3.

We claim:

1. A compound of structure

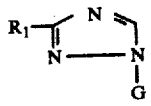

wherein G is [a pentofuranosyl moiety whose 2'-oxygen is trans to the aglycon] *β-D-ribofuranosyl* and $R_1$ is selected from the group consisting of

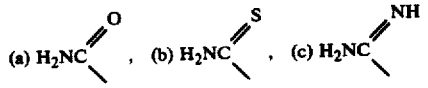

(d) physiologically acceptable acid addition salts of (c),

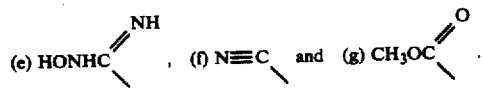

2. A compound selected from the group consisting of 5'-phosphates and 3',5'-cyclic phosphates of a compound according to claim 1.

3. A compound selected from the group consisting of (I) compounds of structure:

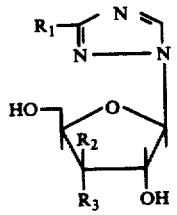

wherein [one of $R_2$ and] $R_3$ [are] *is* hydroxyl[, the other being] *and $R_2$ is* hydrogen, and wherein $R_1$ is selected from the group consisting of

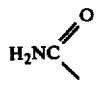

(a)

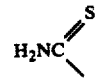

(b)

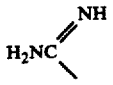

(c)

(d) physiologicaly acceptable acid addition salts of (c),

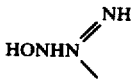

(e)

N≡C and (f)

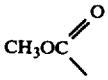

(g)

(II) a 5′-phosphate of a compound (I); and (III) a 3′,5′-cyclic phosphate of a compound (I).

[4. A compound according to claim 3 wherein $R_2$ is hydrogen.]

5. A compound according to claim [4] *3* wherein otherwise free glycosyl hydroxyls are acyl-blocked.

6. A compound according to claim [4] *3* wherein $R_1$ is (a), (b), (c) or (d).

7. A compound according to claim [4] *3* wherein $R_1$ is (a), (b) or (d).

8. The ammonium or alkali metal salt of a 5′-phosphate (II) according to claim 7.

[9. A compound according to claim 3 wherein $R_3$ is hydrogen.]

[10. A compound according to claim 9 wherein otherwise free glycosyl hydroxyls are acyl-blocked.]

[11. A compound according to claim 9 and wherein $R_1$ is (a), (b), (c) or (d).]

[12. A compound according to claim 9 wherein $R_1$ is (a), (b) or (d).]

[13. The ammonium or alkali metal salt of a 5′-phosphate (II) according to claim 12.]

14. A compound (I) according to claim [4] *3*.

15. A compound (II) according to claim [4] *3*.

16. A compound (III) according to claim [4] *3*.

[17. A compound (I) according to claim 9.]

[18. A compound (II) according to claim 9.]

[19. A compound (III) according to claim 9.]

20. The ammonium salt of the 5′-phosphate of 1-(β-D-ribofuransoyl)-1,2,4-triazole-3-carboxamide.

21. 1(-β-D-ribofuranosyl)-1,2,4-triazole-3-carboxamide.

22. 1-(β-D-ribofuranosyl)-1,2,4-triazole-3-thiocarboxamide.

23. 1-(β-D-ribofuranosyl)-1,2,4-triazole-3-carboxamidine.

24. 1-(2,3,5-tri-O-acetyl-β-D-ribofuranosyl)-1,2,4-triazole-3-carboxamide.

25. 1-(β-D-ribofuranosyl)-1,2,4-triazole-3-carboxamide hydrochloride.

[26. 1-(β-D-xylofuranosyl)-1,2,4-triazole-3-carboxamide.]

27. 1-(β-D-ribofuranosyl)-1,2,4-triazole-3-carboxamide 3′,5′-cyclic phosphate.

28. The ammonium salt of the compound of claim 27.

* * * * *